(12) United States Patent  (10) Patent No.: US 6,276,609 B1
Czar et al.                (45) Date of Patent:    Aug. 21, 2001

(54) DATA CARRIER PROVIDED DATA PROCESSING MEANS AND CURRENT PEAK PATTERN SUPPRESSION MEANS

(75) Inventors: Bernhard Czar; Wolfgang Eber; Peter Thüringer, all of Graz (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/348,920

(22) Filed: Jul. 6, 1999

(30) Foreign Application Priority Data

Jul. 7, 1998 (EP) .................................................. 98890200

(51) Int. Cl.$^7$ .................................................. G06K 19/06
(52) U.S. Cl. ........................... 235/492; 235/487; 257/679
(58) Field of Search ..................................... 235/492, 487; 257/679, 532, 508, 659, 660; 361/271

(56) References Cited

U.S. PATENT DOCUMENTS

| | | | | |
|---|---|---|---|---|
| 4,577,214 | * | 3/1986 | Schaper ................................. | 257/691 |
| 4,617,605 | * | 10/1986 | Obrecht et al. ....................... | 361/220 |
| 4,785,166 | * | 11/1988 | Kushima ............................... | 235/441 |
| 4,939,353 | * | 7/1990 | Iijima ..................................... | 235/438 |
| 5,307,309 | * | 4/1994 | Protigal et al. ........................ | 365/63 |
| 5,631,182 | * | 5/1997 | Suwanai et al. ...................... | 438/241 |
| 5,640,004 | * | 6/1997 | Mardinian et al. ................... | 235/492 |
| 5,670,772 | * | 9/1997 | Goto ...................................... | 235/493 |
| 5,736,728 | * | 4/1998 | Matsubara ............................. | 235/492 |
| 5,806,440 | * | 9/1998 | Rowlette et al. ..................... | 110/162 |
| 5,941,447 | * | 8/1999 | Chu et al. ........................ | 228/180.21 |
| 5,998,978 | * | 12/1999 | Connell et al. ....................... | 323/273 |
| 6,070,803 | * | 6/2000 | Stobbe ................................... | 235/492 |
| 6,201,296 | * | 3/2001 | Fries et al. ............................ | 257/679 |

\* cited by examiner

Primary Examiner—Michael G. Lee
Assistant Examiner—Jamara A Franklin

(57) ABSTRACT

In a data carrier (1), or a circuit (3) for such a data carrier (1), in which data processing means (20) are included which can be supplied with a supply voltage (V) and in which, during the processing of data while utilizing a characteristic value, a current peak pattern which is significant of the characteristic value occurs on its supply voltage drain terminals (27, 29, 31, 33 and 28, 30, 32 and 34), current peak pattern suppression means are associated with the data processing means (20;) these suppression means are preferably formed by filter means (36) which include a capacitor (37) which is arranged in the direct vicinity of the data processing means (20) and is connected to the data processing means (20) via low-ohmic connection segments (40, 41, 42, 43, 44, 45, 46, 47).

6 Claims, 3 Drawing Sheets

DATA CARRIER PROVIDED DATA PROCESSING MEANS AND CURRENT PEAK PATTERN SUPPRESSION MEANS

FIELD OF THE INVENTION

The invention relates to a data carrier provided with a circuit which is realized in integrated technology and includes two supply voltage source terminals which can deliver a supply voltage, and includes data processing means which are suitable for processing data while utilizing a characteristic value, are realized in hardware technology and include supply voltage drain terminals via which the supply voltage can be applied to circuit elements of the data processing means, and includes electrically conductive connection means for electrically conductively connecting the supply voltage source terminals to the supply voltage drain terminals, and in which the processing of data by means of the data processing means causes the occurrence of a current peak pattern on supply voltage drain terminals of the data processing means, the pattern configuration of the current peak pattern being dependent on the processed data and on the characteristic value.

The invention also relates to a circuit for a data carrier which is realized in integrated technology and includes two supply voltage source terminals which can deliver a supply voltage, and includes data processing means which are suitable for processing data while utilizing a characteristic value, are realized in hardware technology and include supply voltage drain terminals via which the supply voltage can be applied to circuit elements of the data processing means, and includes electrically conductive connection means for electrically conductively connecting the supply voltage source terminals to the supply voltage drain terminals, and in which the processing of data by means of the data processing means causes the occurrence of a current peak pattern on supply voltage drain terminals of the data processing means, the pattern configuration of the current peak pattern being dependent on the processed data and on the characteristic value.

RELATED ART

A data carrier of the kind set forth in the first paragraph and a circuit of the kind set forth in the second paragraph are commercially available and hence known. The data processing means in the known data carrier and the known circuit are formed by encryption/decryption means whereby data can be encrypted and decrypted. During the execution of an encryption or a decryption operation, a current peak pattern occurs on the supply voltage drain terminals of the encryption/decryption means. This current peak pattern is significant of the data processed in the encryption/decryption means, and significant of the characteristic value used in the encryption/decryption means, i.e. the secret key of these means. It is problematic in the known data carrier and the known circuit that the respective current peak patterns caused occur not only on the supply voltage drain terminals of the encryption/decryption means, but unfortunately also on the supply voltage source terminals of the circuit; consequently, these current peak patterns occur on the supply leads of the circuit, or the data carrier, leading to the supply voltage source terminals. Such occurrence of the respective current peak pattern caused on said supply leads can be used so as to apply given known data for processing to the data processing means an arbitrarily large number of times in succession, and to subject, during the processing of such known data, the invariably the same current peak patterns then produced to scrutinization or detection during which information can be extracted as regards the characteristic value used in the encryption/decryption means, i.e. the secret key, be it while applying intricate but known and available correlation methods or comparison methods and while utilizing the detected current peak patterns. Evidently, such cracking of a secret key is undesirable, because the desired secrecy can then no longer be very reliably guaranteed.

SUMMARY OF THE INVENTION

It is an object of the invention to avoid the described problems and to provide an improved data carrier or an improved circuit for a data carrier while using simple and only very few additional means.

In order to achieve the above objects a data carrier of the kind set forth in the first paragraph according to the invention is characterized in that additionally there are provided suppression means whereby an occurrence on the supply voltage source terminals of the current peak pattern occurring on supply voltage drain terminals of the data processing means can be suppressed.

In order to achieve the above objects, furthermore, a circuit of the kind set forth in the second paragraph according to the invention is characterized in that additionally there are provided suppression means whereby an occurrence on the supply voltage source terminals of the current peak pattern occurring on supply voltage drain terminals of the data processing means can be suppressed.

By taking the steps according to the invention, it is very simply, effectively and reliably ensured that the peak current patterns appearing on the supply voltage drain terminals of the data processing means due to the data processing by the data processing means still occur thereon, but no longer on the supply voltage source terminals of the circuit according to the invention for a data carrier according to the invention, or only in a rudimentary form which has been suppressed to such an extent that unauthorized and undesirable scrutinization or detection of current peak patterns while utilizing supply leads of a circuit according to the invention is no longer possible. The steps according to the invention thus ensure extremely reliably that no undesirable conclusions can be drawn from current peak patterns, and that hence undesirable determination of characteristic values, such as a secret code, a secret key or a so-called hash value and the like, is impossible.

The suppression means may be formed by special data processing means. However, it has been found that it is particularly advantageous to take the steps disclosed in the claims 2 and 9, because such an implementation features simplicity and reliability.

In the simplest case the filter means may be formed by the capacitor and connection segments of the connection means present between the supply voltage source terminals and the capacitor, the ohmic resistance of said connection segments being used as current limiting means which constitute, in conjunction with the capacitor, filter means exhibiting a low-pass behavior. However, it has been found to be even more advantageous to take the steps disclosed in the claims 3 and 10, because the low-pass behavior of the filter means can then be readily adapted to different requirements. It has been found that it is particularly advantageous to take additionally, if necessary, the steps disclosed in the claims 4 and 11.

It is to be noted that the use of a capacitor, which is connected to supply voltage terminals, for the data carrier disclosed in the first paragraph or the circuit disclosed in the second paragraph is known per se. In the known data carrier, or the known circuit, however, this capacitor constitutes a purely auxiliary capacitor which serves to bridge intervals occurring in the power supply. The capacitor in the data carrier according to the invention or the circuit according to the invention, however, forms a part of filter means which constitute suppression means for suppressing current peak patterns.

The capacitor, realized in integrated technology, may have, for example a strip-shaped or L-shaped or U-shaped construction. However, it has been found that it is particularly advantageous to take the steps disclosed in the claims 5 and 12. Such a construction offers very effective attenuation of the current peaks occurring during the processing of data by means of the data processing means.

A construction in conformity with the claims 6 and 13 is also advantageous, because an as short as possible, and hence low-ohmic, realization is thus ensured for all connection segments between the two connection zones of the auxiliary capacitance and the supply voltage drain terminals.

The steps according to the invention have been found to be advantageous notably for a data carrier according to the invention as disclosed in claim 7 or for a circuit according to the invention as disclosed in claim 14, because a very high reliability is thus ensured in respect of the secrecy of a key for the encryption and/or decryption of data.

The above and further aspects of the invention will become apparent from the embodiment described hereinafter and will be illustrated on the basis of this embodiment.

BRIEF DESCRIPTION OF THE DRAWINGS

The invention will be described in detail hereinafter with reference to an embodiment which is shown in the drawings, however, without the invention being restricted thereto.

Figure 3:
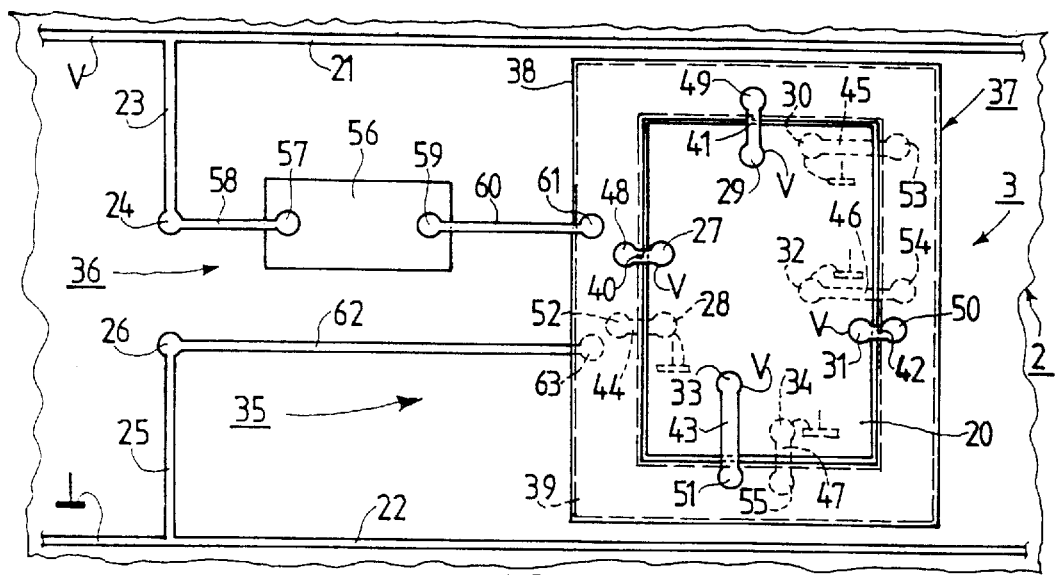
FIG. 3 is a sectional view of a part of the chip of FIG. 2 which includes means for the encryption and decryption of data which are surrounded by a window-like capacitor.
Figure 5:
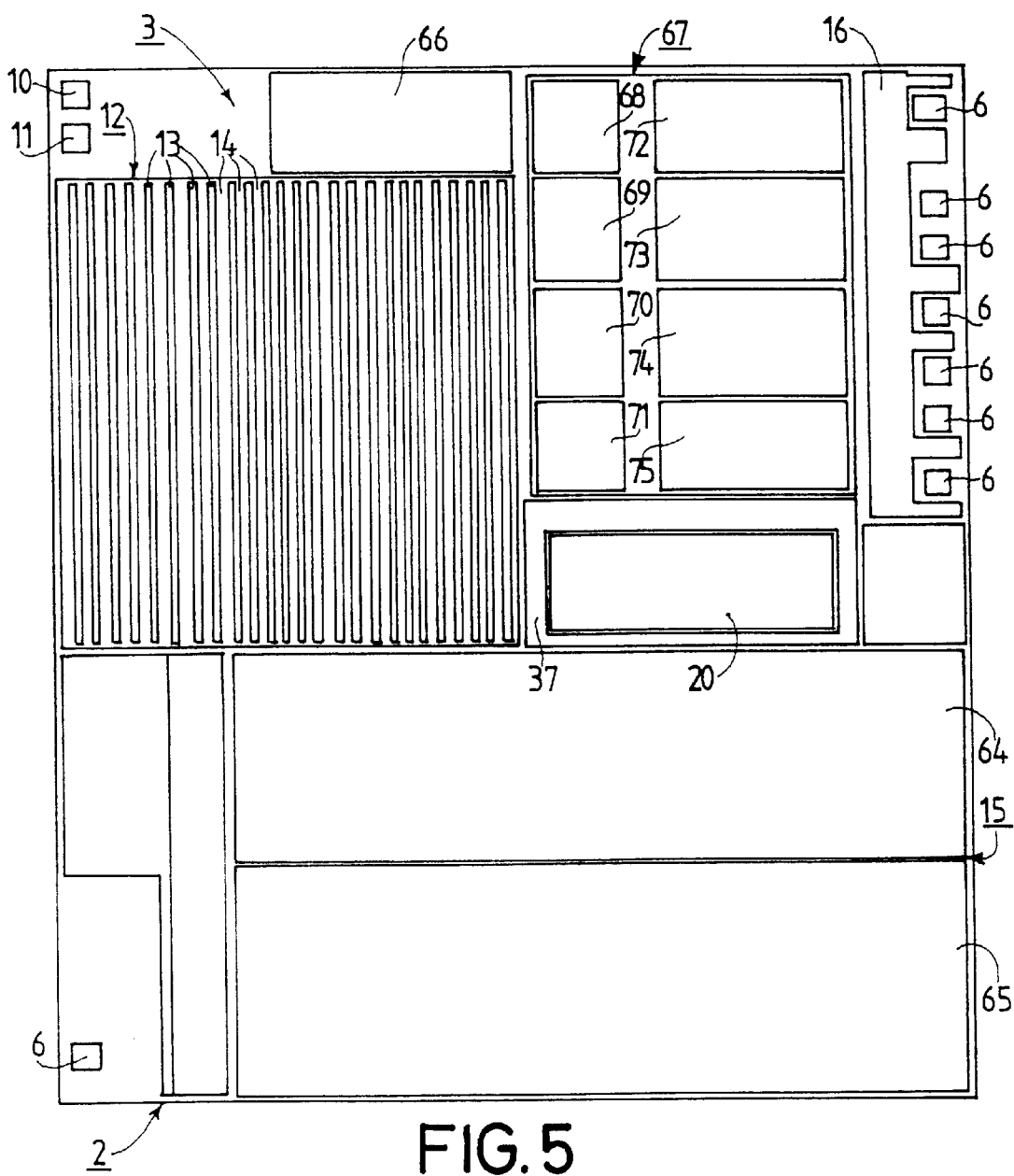
FIG. 5 shows, analogous to FIG. 2, a second embodiment according to the invention of a chip of a data carrier whereby a second embodiment according to the invention of a circuit in integrated technology is implemented.

It is to be explicitly noted that the representation in the FIGS. 3 and 5 is of a highly symbolic nature, because for the actual implementation on a chip the emphasis lies very much on achieving an optimum, space-saving lay-out of circuit components.

DETAILED DESCRIPTION OF THE INVENTION

Figure 1:
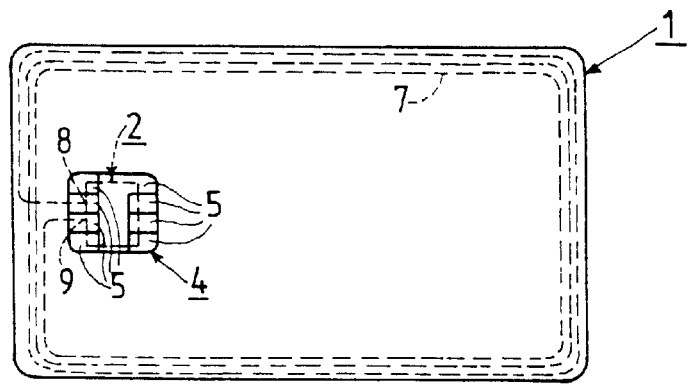
FIG. 1 is a diagrammatic plan view of a first embodiment of a data carrier according to the invention which is constructed as a chip card and includes a chip whereby a first embodiment of a circuit according to the invention is implemented in the data carrier in integrated technology.

FIG. 1 shows a data carrier 1 which is constructed as a so-called chip card. The data carrier 1 includes a chip 2 which is shown in greater detail in FIG. 2 and constitutes a circuit 3 of the data carrier 1; this circuit is diagrammatically represented in the form of blocks in FIG. 2. The data carrier 1 includes a contact field 4 with a total number of eight connection contacts 5 which are connected to chip contacts 6 of the chip 2 in a manner not shown. Contact communication between a write/read station and the chip 2, or the circuit 3 of the chip, is possible via the contacts 5 of the contact field 4 and the chip contacts 6. The data carrier 1 also includes a transmitter coil 7 which is diagrammatically shown in FIG. 1 and whose coil ends are connected to two chip contacts 10 and 11 of the chip 2 in a manner not shown.

Figure 2:
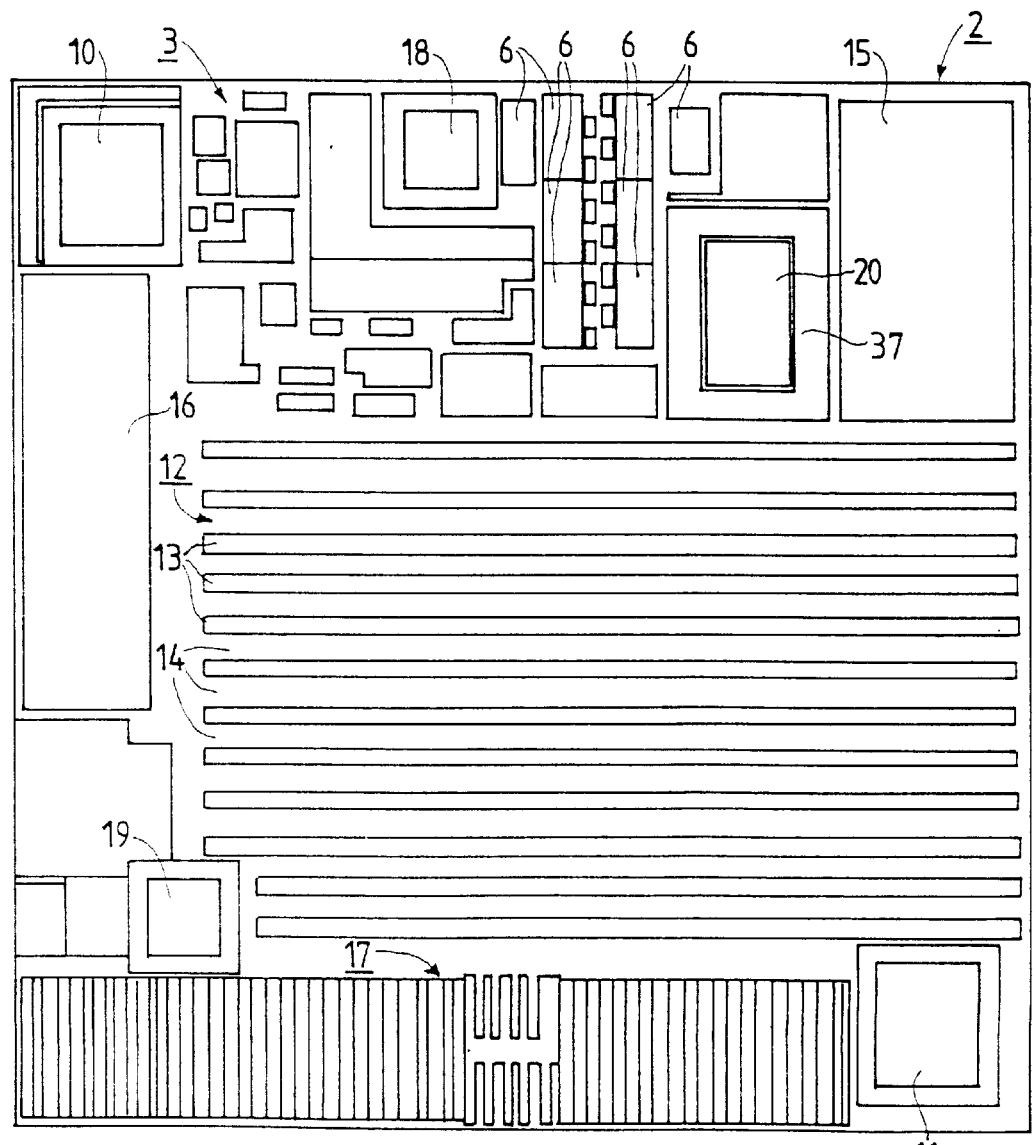
FIG. 2 is a diagrammatic plan view of the chip of the data carrier shown in FIG. 1 whereby the circuit for the data carrier in integrated technology, including means for the encryption and decryption of data, is implemented.

The circuit 3 of the data carrier 1 is realized in integrated technology and consists of a plurality of circuit elements which, as has already been stated, are represented as blocks in FIG. 2. Only a few of these circuit elements which are of particular interest in the present case will be described in detail hereinafter.

The circuit 3 includes a digital section 12 which consists of twelve rows 13 of digital cells (not shown) and wiring ducts 14 which are situated between the rows 13. The digital section 12 constitutes a microprocessor and further digital circuit elements such as gates, counters and the like.

Further elements of the circuit 3 to be mentioned are a memory 15, formed by an EEPROM, an analog section 16 which includes a plurality of transistors, diodes and the like, and a resistor and capacitor configuration 17 which includes a plurality of resistors and capacitors, as well as two test terminals 18 and 19.

Regarding the circuit 3 it is to be noted in particular that it includes data processing means 20 which are suitable for the processing of data while using or utilizing a characteristic value and are realized in hardware technology. In the present case the data processing means 20 are constructed as means 20 for the encryption and decryption of data, said means 20 containing at least a secret key as the characteristic value which is used for the encryption and decryption of data during operation of the means 20.

FIG. 3 shows the part of the chip 2, or the circuit 3, which includes the data processing means 20, i.e. the means 20 for the encryption and decryption of data. FIG. 3 shows two supply leads 21 and 22 wherebetween a supply voltage V is present during operation of the data carrier 1, or the circuit 3, the first supply lead 21 carrying the potential V whereas the second supply lead 22 is connected to ground potential.

A first supply voltage source terminal 24 is connected to the first supply lead via a first lead 23. A second supply voltage source terminal 26 is connected to the second supply lead 22 via a second lead 25. The two supply voltage source terminals 24 and 26 can deliver the supply voltage V, that is to say to the means 20 for the encryption and decryption of data.

The data encryption and decryption means 20 include a plurality of supply voltage drain terminals, the supply voltage drain terminals 27, 28 and 29, 30 and 31, 32 and 33, 34 thereof being shown in FIG. 3. Circuit elements (not shown) of the means 20 can receive the supply voltage V via the supply voltage drain terminals; the potential V occurs on the supply voltage drain terminals 27, 29, 31 and 33 whereas ground potential occurs on the supply voltage drain terminals 28, 30, 32 and 34.

Regarding the data encryption and decryption means 20 it is also to be noted that these means 20, evidently, also include a row of further terminals which are intended to conduct data signals, either so as to apply data to be encrypted to the means 20 or to output encrypted data from the means 20.

The circuit 3 also includes electrically conductive connection means 35 which are intended for electrically conductively connecting the supply voltage source terminals 24 and 26 to the supply voltage drain terminals 27, 29, 31, 33 and 28, 30, 32 and 34. The individual connection segments of the connection means 35 will be described in detail hereinafter.

Because of the fact that the data encryption and decryption means 20 are realized in hardware technology, the behavior of the circuit 3 is such that, upon processing of data by the data processing means 20, i.e. upon encryption and decryption of data, a current peak pattern occurs on the supply voltage drain terminals 27, 29, 31, 33 and 28, 30, 32 and 34 of the data processing means 20 due to the data processing being executed, so due to the encryption or decryption of data. The pattern configuration of the current peak pattern is then dependent on the processed data and on the characteristic value of the data processing means 20, so on the secret key.

The data carrier 1, or its circuit 3, is advantageously additionally provided with suppression means whereby the occurrence on the supply voltage source terminals 24 and 26 of the current peak pattern appearing on the supply voltage drain terminals 27, 28, 29, 30, 31, 32, 33 and 34 of the data processing means 20 can be suppressed. The term "suppressed" is to be understood to mean herein that in the ideal case a current peak pattern is completely erased or at least very strongly attenuated, so that the pattern configuration of the current peak pattern is practically no longer detected. In the present case the suppression means are formed by filter means 36 which are included in the electrically conductive connection means 35. The filter means 36 include a capacitor 37 which is realized in integrated technology. As appears from FIG. 3, the capacitor 37 is arranged so as to adjoin directly the means 20 for the encryption and decryption of data; this is important with a view to effective operation. The capacitor 37 is constructed as a frame in the present case. The capacitor 37 then completely encloses the means 20. The capacitor 37 is realized in known integrated technology and has a layered construction in the present case, the upper layer in FIG. 3 constituting a first connection zone 38 whereas the lower layer in FIG. 3 constitutes a second connection zone 39. The two connection zones 38 and 39 of the capacitance 37 and the supply voltage drain terminals 27, 29, 31, 33 and 28, 30, 32, 34 of the means 20 are electrically conductively connected via low-ohmic connection segments 40, 41, 42, 43, 44, 45, 46 and 47 of the connection means 35. The connection segments 40, 41, 42, 43, 44, 45, 46 and 47 emanate from terminals 48, 49, 50, 51, 52, 53, 54 and 55, the terminals 48, 49, 50 and 51 of which are electrically conductively connected to the first connection zone 38 of the capacitor 37 whereas the terminals 52, 53, 54 and 55 are electrically conductively connected to the second connection zone 39 of the capacitor 37.

The filter means 36 also include an ohmic resistor 56 which is also realized in integrated technology and is arranged between the supply voltage source terminal 24 and the connection zone 38 of the capacitor 37 which is electrically conductively connected to said supply voltage source terminal 24; this resistor serves as a current limiting means and constitutes, in conjunction with the capacitor 37, the filter means 36 having a low-pass behavior. The ohmic resistor 56 has a first resistor terminal 57 which is connected, via a connection segment 58 of the connection means 35, to the first supply voltage source terminal 24. The ohmic resistor 56 also includes a second resistor terminal 59 which is electrically conductively connected, via a further connection segment 60 of the connection means 35, to a first capacitor terminal 61 of the capacitor 37. The second supply voltage source terminal 26 is electrically conductively connected, via a further connection segment 62 of the connection means 35, to a second capacitor terminal 63 of the capacitor 37. The first capacitor terminal 61 is electrically conductively connected to the first connection zone 38 and the second capacitor terminal 63 is electrically conductively connected to the second connection zone 39 of the capacitor 37. It is also to be noted that a transistor could also be provided as a current limiting means instead of an ohmic resistor.

Figure 4:
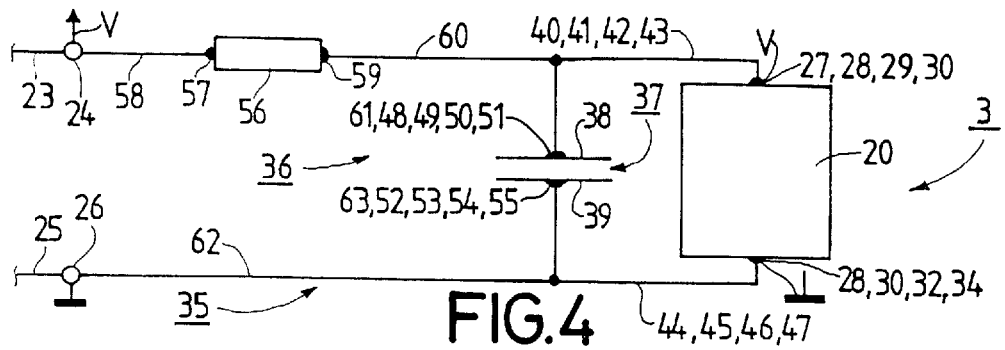
FIG. 4 shows the circuit diagram of the part of the chip shown in FIG. 3.

FIG. 4 shows the circuit diagram for the integrated implementation of FIG. 3. FIG. 4 clearly shows that the filter means 36, formed by the ohmic resistor 56 and the capacitor 37, constitute a low-pass filter.

Because of the low-pass behavior of the filter means 36, it is simply achieved that a current peak pattern appearing on the supply voltage drain terminals 27, 29, 31, 33 and 28, 30, 32, 34 due to the execution of a data encryption or decryption operation by the means 20 is attenuated to such an extent that this current peak pattern occurs on the supply voltage source terminals 24 and 26 of the circuit 3 in only a rudimentary, strongly attenuated form or even no longer occurs thereon. As a result, a current peak pattern will practically no longer occur on the supply leads 21 and 22 of the circuit 3 either, so that it becomes impossible to extract, by scrutinization or detection of current peak patterns, information regarding the key used for the encryption and decryption in the means 20.

FIG. 5 shows a further chip 2. The chip 2 implements a circuit 3 of a data carrier which is diagrammatically represented by blocks in FIG. 5. The chip 2 of FIG. 5 includes, analogous to the chip 2 shown in FIG. 2, chip contacts 6, 10 and 11, a digital section 12 with rows 13 of digital cells and with wiring ducts 14, a memory 15 which is formed by an EEPROM and consists of two sections 64 and 65, and an analog section 16. The chip 2 of FIG. 5 also includes a RAM 66 and a ROM 67, consisting of eight parts 68, 69, 70, 71, 72, 73, 74 and 75.

The chip 2 of FIG. 5 also includes data processing means 20 which are suitable for the processing of data and are realized in hardware technology. The data processing means 20 are again constructed as means 20 for the encryption and decryption of data.

Figure 6:
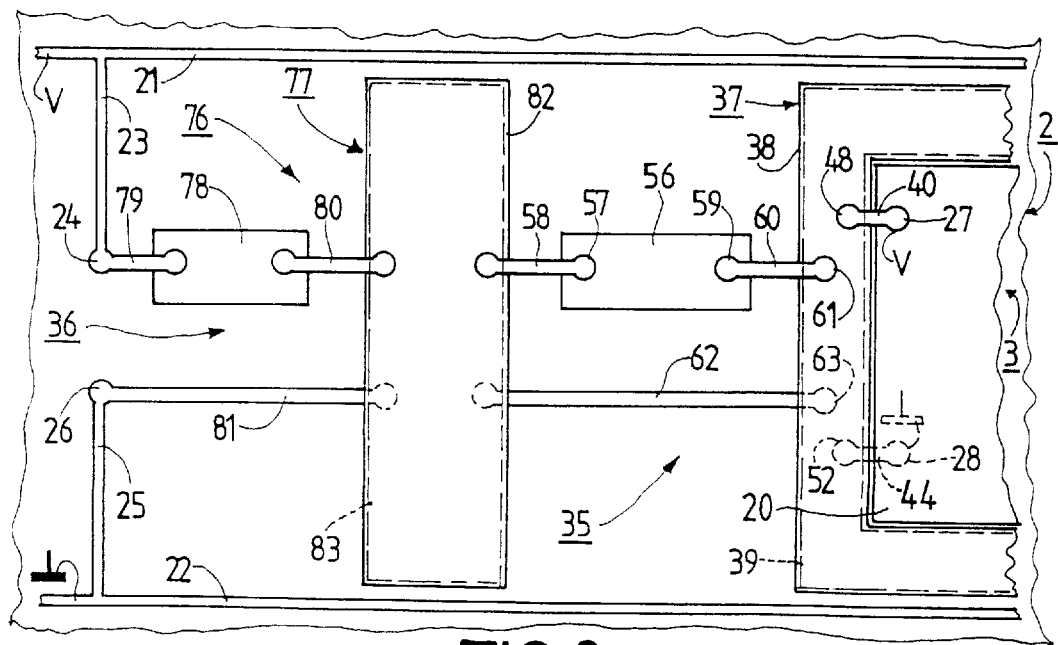
FIG. 6 shows, analogous to FIG. 3, a part of a chip which includes a second embodiment of a circuit according to the invention.

The circuit 3 in the further chip 2 of FIG. 5, a part of which is shown in FIG. 6, includes filter means 36 which include, in addition to the capacitor 37 and the ohmic resistor 56, a further filter stage 76 which succeeds the supply voltage source terminals 24 and 26. The further filter stage 76 in this case consists of a second capacitor 77 and a second ohmic resistor 78 which are connected, via connection segments 79, 80 and 81 of the connection means 35, to one another and to the supply voltage source terminals 24 and 26; the connection segments 58 and 56 of the connection means 35 are connected to the second capacitor 77 which for this purpose includes two connection zones 82 and 83 whereto the connection segments 80 and 81 are also connected.

Because of the presence of the further filter stage 76 in the circuit 3 of the chip 2 of FIG. 5, the suppression of current peaks of current peak patterns occurring on the supply voltage drain terminals of the means 20 is improved in comparison with the circuit 3 of the chip 2 of FIG. 2.

It is to be noted that, if necessary and useful, the filter means 36 may also include further filter stages.

The invention is not limited to the two described embodiments of the invention. Each of these two embodiments is provided with only a single capacitor 37 which encloses the data processing means 20. However, if necessary and effective, alternatively two or more parallel connected capacitors may be provided. In both described embodiments the data processing means 20, with which a capacitor 37 is associated, are formed by means 20 for the encryption and decryption of data. This need not always be the case, because data processing means with which at least one capacitor is associated may also be formed by means for the encoding and decoding of data. It may also be useful to associate suppression means with other data processing means in order to suppress current peak patterns produced by the data processing means. The data carriers in conformity with the two described embodiments of the invention are arranged for communication by means of contacts and a transmission coil. However, a data carrier according to the invention may alternatively include only contacts or only a transmission coil for communication.

What is claimed is:

1. A data carrier having a data processor, the data processor containing and utilizing a characteristic value during data processing and having voltage drain terminals for powering the data processor, current peak patterns occurring at the voltage drain terminals of the data processor during data processing, the current peak patterns depending upon the characteristic value and providing a way, if the current peak patterns are detectable, for unauthorized determination of the characteristic value, the data carrier deterring such unauthorized determination of the characteristic value, comprising:

a capacitor totally enclosing the data processor for preventing physical access to the voltage drain terminals of the data processor, the voltage drain terminals of the data processor being connected to the capacitor internally of the capacitor, the capacitor being externally connected to supply voltage source terminals of a supply voltage source and in turn powering the data processor located within the capacitor, the current peak patterns at the voltage drain terminals of the data processor being undetectable at the supply voltage source terminals, whereby unauthorized determination of the characteristic value is deterred.

2. A data carrier as in claim 1 wherein the capacitor is connected to one of the supply voltage source terminals through a resistor, the resistor and capacitor in combination forming a low-pass filter.

3. A data carrier as in claim 1 wherein a low-pass filter is located between the capacitor and the supply voltage source terminal.

4. A data carrier as in claim 1 wherein the capacitor has a frame construction.

5. A data carrier as in claim 1 wherein the characteristic value is a secret key for encryption and/or decryption of data.

6. A circuit for a data carrier having a data processor, the data processor containing and utilizing a characteristic value during data processing and having voltage drain terminals for powering the data processor, current peak patterns occurring at the voltage drain terminals of the data processor during data processing, the current peak patterns depending upon the characteristic value and providing a way, if detectable, for unauthorized determination of the characteristic value, the circuit deterring such unauthorized determination of the characteristic value, comprising:

a capacitor totally enclosing the data processor for preventing physical access to the voltage drain terminals of the data processor, the voltage drain terminals of the data processor being connected to the capacitor internally of the capacitor;

the capacitor being externally connected to supply voltage source terminals of a supply voltage source and in turn powering the data processor located within the capacitor, the current peak patterns at the voltage drain terminals of the data processor being undetectable at the supply voltage source terminals, whereby unauthorized determination of the characteristic value is deterred.

* * * * *